JOHN B. BUTTON.
Improvement in Device for Ruptured Hose Pipes.

No. 122,435.  Patented Jan. 2, 1872.

Witnesses:  
J. B. Smith  
J. E. Smith

Inventor:  
John B. Button 122,435

UNITED STATES PATENT OFFICE.

JOHN B. BUTTON, OF MILWAUKEE, WISCONSIN.

IMPROVEMENT IN SELF-PACKING PATCHES FOR HOSE-PIPES.

Specification forming part of Letters Patent No. 122,435, dated January 2, 1872.

SPECIFICATION.

I, JOHN B. BUTTON, of Milwaukee, in the county of Milwaukee, in the State of Wisconsin, have invented certain Improvements in Self-Packing Patch, of which the following is a specification:

Nature and Object of the Invention.

My invention is for the purpose of mending a hose or pipe that may be burst when in use, and is a case that goes around the pipe and is secured by a fastening. This case has an inward projection, with a rubber or flexible covering to the inside projection or flange, which fits down tight onto or around the break in the hose or pipe, and the water or other liquid presses against the outside of the case and reacts against the flange and makes the fastening tight. For pipes that are made of rubber or leather, or any other flexible material, a flange of metal without the rubber will answer. This arrangement is calculated to stop leaks in all kind of pipes, whether for water, gas, or any other material.

Description of Drawing forming part of this Specification.

Figure 1:
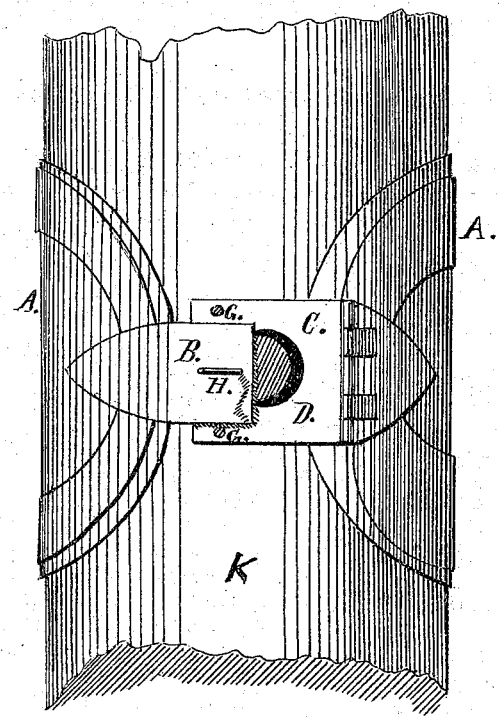
Figure 2:
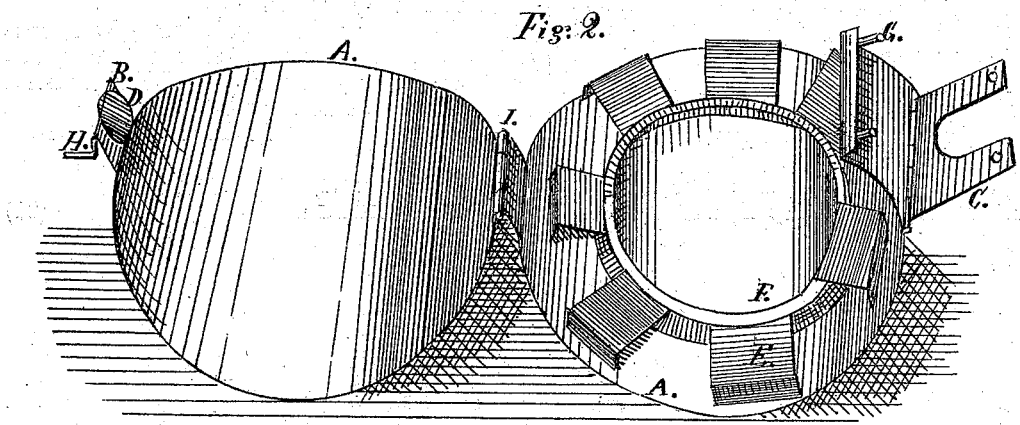

Figure 1 is a perspective view of my invention secured to a hose; and Fig. 2, a perspective view of my invention open.

General Description.

A is the outside case; B, the clasp on one side of the case; C, an outside clasp hung with a hinge on the other side of the case; D, an eccentric attached to clasp B, and operated with crank H; E, abutments which sustain the flange F. This flange F is made double, so that a ring of rubber or other flexible material is fitted in between the two flanges; G, an inside clasp, with a couple of pins, which clasp C shuts down onto; and these two pins pass through holes in the two prongs of C, and the inside of G is turned up, so that eccentric D will hook against that flange, and, as it is turned, will draw the case tight around a hose or pipe; H, crank to operate eccentric D; I, hinge which holds the two sides of the case together; K, pipe, shown to show the case in position.

This apparatus is operated by putting it around a hose or pipe, the flange E covering the break, the clasps put together, and the eccentric turned to hold it in position, and the water or fluid streaming out presses against the case and back against the flange, and makes a tight joint.

This apparatus may be fastened together in various ways, and the flange may be made of metal alone, or lined with flexible material, as described.

Claim.

I claim as my invention—

A self-packing patch, with flange F and case A arranged so that the pressure of water, gas, or other fluid against flange F shall make a tight joint, substantially as described.

JOHN B. BUTTON.

Witnesses:
J. B. SMITH,
F. E. SMITH.

(81)